United States Patent [19]
Jones

[11] 3,801,045
[45] Apr. 2, 1974

[54] INTEGRAL CONTROL SYSTEM FOR SAILPLANES
[76] Inventor: Edward B. Jones, General Delivery, Perryman, Md. 21130
[22] Filed: June 29, 1972
[21] Appl. No.: 267,504

[52] U.S. Cl. .............................. 244/16, 244/76 C
[51] Int. Cl. ............................................ B64c 31/02
[58] Field of Search ............ 244/16, 38, 40 R, 42 R, 244/45, 48, 83 R, 83 C, 84

[56] References Cited
UNITED STATES PATENTS
1,906,005  4/1933  Hall ..................................... 244/48
2,623,712  12/1952 Spratt .................................. 244/48
2,198,893  4/1940  Waveren ........................... 244/42 R
3,477,664  11/1969 Jones .................................. 244/48

Primary Examiner—Duane A. Reger
Assistant Examiner—Jesus D. Sotelo
Attorney, Agent, or Firm—Walter G. Finch

[57] ABSTRACT

An internal control system is provided for sailplanes for dynamic soaring. This system permits coordinated movement between any two of three elements, namely the wing, elevator, and control stick, independent of the third, and provides a means of aileron control on a pivotable wing without externally exposed wires or struts to create drag. Any change of pitch of the wing is countered by a change of pitch of the elevator without changing the position of the control stick. If the wing is held fixed, for example, in landing, the stick will move the elevator. If the elevator is held fixed or becomes jammed, the control stick can be used to change the pitch of the wing to maintain control. This coordinated movement is made possible by differential linkages provided in the controls.

8 Claims, 4 Drawing Figures

PATENTED APR 2 1974  3,801,045
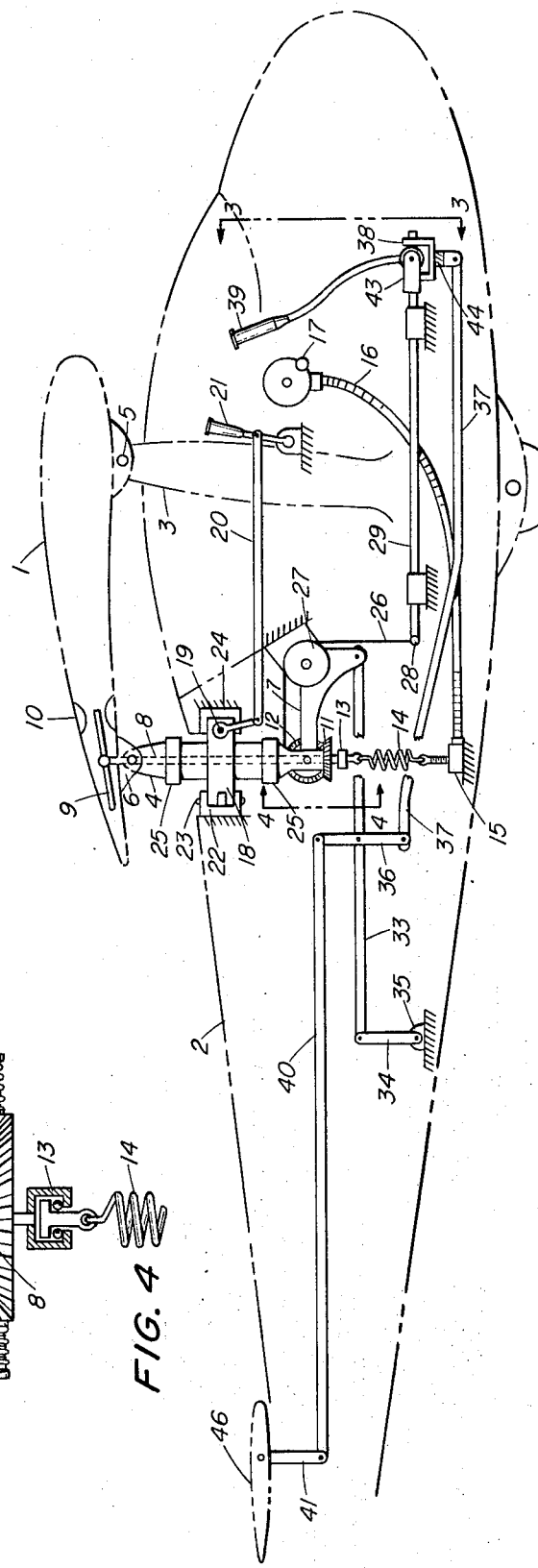
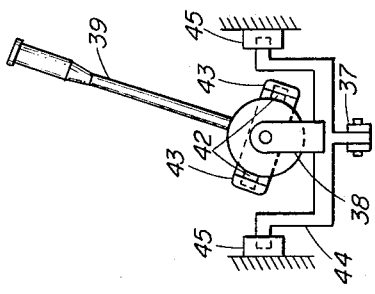
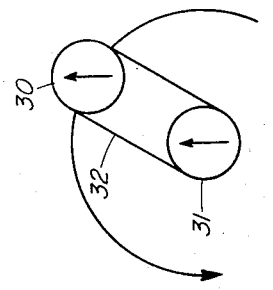
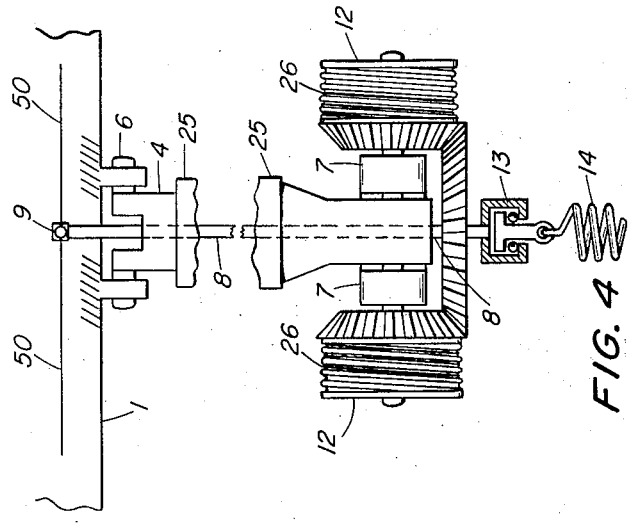

INTEGRAL CONTROL SYSTEM FOR SAILPLANES

This invention relates generally to sailplanes, and more particularly it pertains to an integral control system for sailplanes designed for dynamic soaring.

Sailplanes for dynamic soaring, such as described in U.S. Pat. No. 3,477,664, issued Nov. 11, 1969, entitled "Flutter Wing For A Sailplane," require the wing to change pitch in order to obtain energy from turbulence or gusts of wind. This necessitates automatic coordination between the wing and the elevator in order to maintain stable pitch control. However, it is desirable that this coordination be independent of the control stick.

It is an object of this invention, therefore, to provide an integral control system which permits coordinated movement between any two of the wing, elevator, and control stick independent of the third.

Another object of this invention is to provide a control system where-in any change of pitch of the wing is countered by a change of pitch of the elevator without changing the position of the control stick; or if the wing is held fixed (as for landing), the control stick will move the elevator; and if the elevator is held fixed or become jammed the control stick will change the pitch of the wing to maintain control. This coordinated movement is made possible by differential linkage in the controls.

It is to be noted that since the wing must change pitch, there has to be a means of control between the stick and the ailerons independent of the movement of the wing. This must be done without externally exposed wires or struts to create drag. In the present invention, the connection is made by a shaft running up through the rear strut of the sailplane which is moveable.

The problem of connecting this shaft with the roll component of the control stick independent of the vertical movement of the rear strut is thus presented. Since axial movement, radial movement, and longitudinal movement are mutually independent, an integral control system has been provided to solve the problem presented.

FIG. 1 is a side schematic view of an integral control system for a sailplane for use in dynamic soaring incorporating features of this invention;

FIG. 2 is a schematic of an illustration of components of the invention;

FIG. 3 is a cross section taken along line 3—3 of FIG. 1; and

FIG. 4 is a cross section taken along line 4—4 of FIG. 1.

Referring now to FIG. 1 of the drawing, there is shown a sailplane having a wing 1 which is attached to a fuselage 2 by fixed struts 3 positioned on opposite sides of the wing 1 and a moveable rear strut 4. It is to be noted that the fixed struts 3 and the moveable strut 4 are designed to minimize the drag on the sailplane.

Each fixed strut 3 is attached to the forward part of the wing through a pivot joint 5. The rear strut 4 is attached to the wing 1 near its trailing edge by a pivot joint 6 and to a bellcrank 7 located within the fuselage 2, as shown best in FIG. 4. A shaft 8 is positioned inside of the rear strut 4. This shaft 8 extends through the pivot joint 6 up into the trailing edge of the wing 1 to a T-bar 9, shown in FIGS. 1 and 4.

Control wires 50 are attached to this T-bar 9. These control wires 50 lead to and operate the ailerons in a conventional manner. The T-bar 9 is pivotally mounted to permit it to follow the flexing of the wing 1 through restrainment of guides 10.

As shown in FIGS. 1 and 4, there is provided a pinion gear 11 near the bottom of shaft 8. This pinion gear 11 meshes with gears on cable drums 12 on each side of the bellcrank 7. These two cable drums 12 are counter-rotating due to meshing with pinion gear 11.

At the lower end of shaft 8, there is attached one side of a swivel joint 13. To the other side of swivel joint 13, there is attached a spring 14. This spring 14 is, in turn, anchored to a telescoping screw 15.

Screw 15 is adjustable, and its height is adjustable by the pilot during flight by means of a flexible shaft 16 which is connected to a crank 17 positioned in the cockpit of the sailplane.

It is to be noted that the helical spring 14 extends when the lifting force of the wind 1 is greater than normal and that it contracts when the lifting force is less than normal. This permits the wing 1 to change pitch and threby vectoring the vertical forces to forward thrust of the sailplane.

Brake shoes 18 are provided on each side of the rear strut 4. These brake shoes 18 are opened and closed by the pilot by a screw 19 connected through a rod 20 to a lever 21 to lock the wing 1 in any position set by the adjustable screw 15.

The rear ends of the brake shoes 18 are hinged and anchored to the structure of the fuselage 2 by a bracket 22. This bracket 22 encases the brake shoes 18 on the top and bottom so as to restrict vertical movement of the shoes 18. These brake shoes 18 form a mortise and tenon joint and are held together by a pin 23 which slides through both shoes 18 and the top and bottom of the bracket 22.

The forward or front end of brake shoes 18 are encased by a bracket 24 to prevent vertical movement and to permit only limited horizontal movement for opening and closing of the brake shoes 18.

The screw 19 binds the brake shoes 18 together against the rear strut 4 to lock movement of the wing 1. Likewise, the screw 19 opens the brake shoes 18 to provide freedom of movement.

Rubber stops 25, shown in FIG. 1 and 4, are attached to the rear strut 4 to limit its travel by making contact with the brake shoes 18.

As previously mentioned, the control of the ailerons is effected through the pinion gear 11 meshing with the gears on the cable drums 12 on each side of the bellcrank 7. A control cable 26 is attached to drums 12, after passing over guide pulleys 27 located on each side and on a common axle with bellcrank 7, to a T-bar 28. This T-bar 28 is, in turn, attached to a control shaft 29 for the ailerons.

It is to be noted that the drums 12 and the pulleys 27 are of equal diameter so that there will be no relative rotation between the two as bellcrank 7 rotates.

Referring now to the schematic of FIG. 2, there is shown a pulley 30 in planetary rotation around a fixed pulley 31, with the two pulleys 30 and 31 being coupled together by a cord or chain 32. On the face of each pulley 30 or 31, there is an arrow pointing in a vertical direction. As pulley 30 revolves around pulley 31, the arrows always remain pointed in the vertical direction. This indicates that no rotation has occurred relative to the pulleys 30 and 31, and that relative rotation is independent of planetary rotation of the pulleys 30 and 31.

Thus, the bell-crank 7, shown in FIGS. 1 and 4, can have angular rotation without rotation of drums 12 and pulleys 27. Thus, only when drums 12 and pulleys 27 rotate relative to one another is control of the ailerons effected. Both planetary and relative rotation may occur simultaneously however.

A control link 33 is attached to bellcrank 7 and to an arm 34 which is anchored at pivot 35 of the sailplane structure. At or near the center of link 33, there is attached a differential link 36. This differential link 36 may be attached at its center point or at any point to provide proper mechanical displacement.

The lower end of link 36 is attached to a link 37, which, in turn, is attached to a pitch gimbal 38 of a control stick 39, shown in FIGS. 1 and 3. The upper end of link 36 is attached to link 40. This link 40 is then attached to the arm 41 of the elevator 46 of the sailplane.

It is to be noted that in conventional controls for sailplanes, the link rod or wire controlling the pitch movements of the sailplane is connected directly to the bottom of the control stick. The bottom of the control stick rotates about the roll axis as well as about the pitch axis. Hence, an application of aileron control effects a minute change in control of the elevation of the sailplane. This is minor, however, and is of no crucial consequence.

To eliminate simultaneous effects, however, controls have been designed to make pitch control entirely independent of roll control.

Referring back to FIG. 3, there is shown a set of gimbels as viewed from the front of the fuselage 2. The bottom of the control stick 39 is provided with four pivot points 42 attached. Alternate pivots 42 are attached to a roll gimbal 43 and to the pitch gimbal 38. The pitch gimbal 38 is attached to a cradle 44 mounted in pivots 45 which, in turn, are anchored to the structure of the fuselage 2. A link 37 is attached to the bottom of cradle 44.

In operation, a side thrust of the top of the stick 39 twists the roll gimbal 43 to which the shaft 29 and the T-bar 28 are attached. The control cables 26 attached to the ends of T-bar 28 transmit angular motion over pulleys 27 to the drums 12, to pinion gear 11, to shaft 8, to T-bar 9, and on to the ailerons of the sailplane in a conventional manner.

Returning again to FIGS. 1 and 3, a forward motion of stick 39 transmits motion to the pitch gimbal 38, to link 37, to link 36, to link 40, to elevator arm 41 increasing the pitch of the sailplane elevator 46. Motion of the stick 39 is not normally transmitted to the wind 1 because of resistance of spring 14, but will do so if the elevator 46 is restrained for some reason.

In this case, link 40 remains stationary, link 33 moves rearward, with bellcrank 7 rotating clockwise, to move strut 4 and the trailing edge of the wing 1 upwards.

An upward gust of wind or increase of lift on the wing 1 will pull strut 4 upward, causing the bellcrank 7 to rotate clockwise to push links 33, 36, and 40 to the rear, and thus the pitch of the elevator is decreased. Opposite inputs effect opposite responses.

It is to be noted that this system of controls is designed primarily for sailplanes. However, the controls can be applied to powered aircraft as well.

Obviously many modifications and variations of the present invention are possible in light of the above teachings. It is, therefore, to be understood that within the scope of the appended claims the invention may be practices otherwise than as specifically described.

What is claimed is:

1. In combination, structure defining an aircraft having a fuselage, an elevator, and a wing having ailerons positioned on the trailing edge of the wing;
    attachment means for pivotally connecting the forward portion of said wing to said fuselage;
    a substantially vertically movable strut pivotally connected at its upper end to the trailing edge of said wing and having a channel vertically disposed therein;
    shaft means positioned in the channel in said movable strut, the shaft means being rotatably connected to said movable strut at the lower end of said strut;
    swivel joint means connected to the lower end of said shaft means;
    means for adjusting the pitch of said wing;
    elastic means for connecting said last-mentioned means to said swivel joint means, whereby said elastic means is extended when the lifting force of the wing is greater than normal and contracted when the lifting force is less than normal to permit said wing to change pitch and thereby to vector the vertical forces acting on said wing to produce forward thrust;
    bellcrank means connected to said movable strut and pivotally connected to a point on the fuselage of the aircraft; and,
    a linkage mechanism connecting said elevator to said bellcrank means, whereby said linkage mechanism coordinates the pitch of said wing and elevator to maintain stable flight of the aircraft on imposition of a de-stabilizing external force on said wing.

2. The combination as recited in claim 1 and further comprising:
    pitch gimbal means disposed in the fuselage of the aircraft;
    linkage means connecting said linkage mechanism to the pitch gimbal means; and,
    manual control means attached to said pitch gimbal means for controlling the pitch attitude of the aircraft, movement of said manual control means transmitting motion to the elevator gimbal through the mechanical train comprised of the pitch gimbal, linkage means, and linkage mechanism.

3. The combination of claim 2 and further comprising:
    roll gimbal means disposed in the fuselage of the aircraft;
    a shaft linkage connected at one end to said roll gimbal means;
    means attached to the second end of the shaft linkage and also to the movable strut for transmitting angular motion from said manual control means to said movable strut and thus to the wing.

4. The combination of claim 2 wherein said linkage mechanism comprises:
    a first link connected to the bellcrank means;
    a second link connected to the pitch gimbal means;
    a differential link connected to said first link at a point lying on said differential link between the ends thereof, and connected to said second link at one end thereof;

a third link connected to the other end of the differential link and also to the elevator, whereby a restraint of movement of the elevator causes the third link to remain stationary on movement of the manual control means, causes the first link to move rearwardly of the aircraft, and causes the bellcrank means to rotate and to move the movable strut upwardly, thereby to cause the trailing edge of the wing to move away from the body of the aircraft, and whereby a change of lift on the wing causes the movable strut to move from its position, thus causing the bellcrank means to rotate and to thereby cause the first link, the differential link, and the third link to move from the positions then occupied to cause a change in the pitch of the elevator.

5. The combination as recited in claim 1 and further comprising brake means for restraining movement of said movable strut whereby the position of the strut may be maintained during landing approach and under turbulent conditions.

6. In combination, structure defining a plane having a fuselage and a wing having ailerons symmetrically positioned on the trailing edge of the wing, upwardly extending fixed spaced strut members positioned and rigidly fixed on opposite sides of said fuselage and pivotally connected at their upper ends to the forward part of said wing, a substantially vertically movable hollow strut, a bellcrank within said fuselage having a cable drum on each side thereof, said movable strut being pivotally connected at its upper end to the trailing edge of said wing and at its lower end to said bellcrank, pivotally mounted first T-bar means in the trailing edge of said wing, control members attached to said first T-bar means and to said ailerons for control of said ailerons, first shaft means positioned on the inside of said hollow strut and extending therethrough, with the upper end of said shaft means being connected to said first T-bar means, pinion gear means on said first shaft means and pinion gear means on said cable drums for rotating said cable drums in opposite directions, pulley means mounted on a common axle with said bellcrank, a second T-bar means, second shaft means connected to said second T-bar means, cable means for connecting said second T-bar means through said pulley means to said cable drums, and roll control gimbal means for rotating said second shaft means, whereby upon rotation of said second shaft means, said cable drums transmit motion to said first shaft means to move said first T-bar means and thus control the position of said ailerons to control the roll of said plane.

7. The combination as recited in claim 6, elevator means for said plane, pitch gimbal means, and linkage mechanism for connecting said pitch gimbal means to said elevator means for controlling said plane in pitch.

8. The combination as recited in claim 7, other linkage mechanism connected to said first linkage mechanism and to said bellcrank, whereby when said elevator means are restrained, the motion from said pitch gimbal means will be transmitted through said linkage mechanisms to said wing to control the pitch thereof.

* * * * *